(12) United States Patent
Thomas et al.

(10) Patent No.: US 9,047,226 B2
(45) Date of Patent: Jun. 2, 2015

(54) COMPUTING DEVICE HAVING OPTIMIZED FILE SYSTEM AND METHODS FOR USE THEREIN

(71) Applicant: Sharp Laboratories of America, Inc., Camas, WA (US)

(72) Inventors: Renjit Tom Thomas, Vancouver, WA (US); Bryan Severt Hallberg, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 252 days.

(21) Appl. No.: 13/848,538

(22) Filed: Mar. 21, 2013

(65) Prior Publication Data

US 2014/0289470 A1    Sep. 25, 2014

(51) Int. Cl.
   *G06F 12/08*   (2006.01)
   *G06F 12/12*   (2006.01)
   *G06F 17/30*   (2006.01)

(52) U.S. Cl.
   CPC .......... *G06F 12/128* (2013.01); *G06F 12/0811* (2013.01); *G06F 12/0866* (2013.01); *G06F 17/30067* (2013.01)

(58) Field of Classification Search
   CPC .................................................. G06F 12/0866
   See application file for complete search history.

(56) References Cited

U.S. PATENT DOCUMENTS

| | | | |
|---|---|---|---|
| 6,269,420 B1 * | 7/2001 | Horie | 711/103 |
| 6,990,526 B1 * | 1/2006 | Zhu | 709/227 |
| 2008/0294802 A1 * | 11/2008 | Kohinata et al. | 710/6 |
| 2011/0138108 A1 | 6/2011 | Li | |
| 2012/0239869 A1 | 9/2012 | Chiueh et al. | |

FOREIGN PATENT DOCUMENTS

WO    WO2011023111    3/2011

* cited by examiner

*Primary Examiner* — Yong Choe
(74) *Attorney, Agent, or Firm* — Scot A. Reader

(57) ABSTRACT

A computing device having an optimized file system and methods for use therein. File system optimizations include sector-aligned writes, anchored cluster searches, anchored index searches, companion caches dedicated to particular file management data types and predictive cache updates, all of which expedite processing on the computing device. The file system optimizations are especially advantageous for data collection systems where an embedded device is tasked with logging to a target memory data received in a continuous data stream and where none of the streamed data is deleted until after the target memory has been offloaded to another device.

16 Claims, 13 Drawing Sheets

COMPUTING DEVICE HAVING OPTIMIZED FILE SYSTEM AND METHODS FOR USE THEREIN

BACKGROUND OF THE INVENTION

The present invention relates to a computing device having an optimized file system and methods for use therein.

Computing devices often support file systems. Since computational and memory resources are limited in computing devices, there is a need to make these file systems as efficient as possible. This is especially true for embedded computing devices where file operations are frequently performed, such as in embedded computing devices tasked with logging continuous data streams.

One area where efficiencies in file systems for computing devices are needed is reducing the time spent searching for available memory locations in a target physical memory (henceforth referred to simply as target memory) when performing data writes. In a typical file system, whenever new data needs to be written to a target memory, if all the sectors in the current cluster are exhausted, the file system searches through clusters of the target memory in sequence, always starting from the same start cluster of a sequence number close to zero, until an available cluster is found. An advantage of this approach is that if one cluster becomes available (such as when a user deletes a file) while other clusters of higher sequence numbers remain unavailable, the available cluster is quickly reallocated. On the other hand, a disadvantage of this approach is that always starting a sequential search for an available cluster from the same start cluster is a time-consuming process that can starve other processing tasks, dramatically slow operation of the computing device and reduce battery life of the computing device.

Another area where efficiencies in file systems for computing devices are needed is in minimizing cache faults when performing data reads and writes. For example, before a file system writes new data to a sector of a target memory, existing data from the sector must be read to a buffer where the new data are merged with the existing data. If the new data were instead written directly to the target memory (without first buffering the sector to a buffer), the existing data in the target memory would be lost. Accordingly, in a typical file system, a single cache is assigned to retain data from the most recently accessed sector of the target memory. Retention in a cache of data from the most recently accessed sector can speed-up data writes by obviating the need to read data from the target memory to the buffer when consecutive data writes are made to the same sector. Retention in the cache of data from the most recently accessed sector can also speed-up data reads by obviating the need to read data from the target memory to the buffer when consecutive data reads are made from the same sector. However, since consecutive data reads and writes are often made to different sectors, cache faults necessitating reading of data from the target memory are frequent, leading to extra processing that can starve other processing tasks, dramatically slow operation of the computing device and reduce battery life of the computing device.

SUMMARY OF THE INVENTION

The present invention provides a computing device having an optimized file system and methods for use therein. The computing device and methods are particularly advantageous for data collection systems where an embedded device is tasked with logging to a target memory data received in a continuous data stream and where none of the streamed data is deleted until after the target memory has been offloaded to another device.

In one aspect of the invention, a computing device performs sector-aligned data writes of streamed data. In sector-aligned writes, the computing device accumulates streamed data until the data reach a sector size and then writes the sector-wide streamed data directly into an available sector of a target memory on the computing device. For example, when the computing device receives streamed data, the computing device adds the streamed data to accumulated streamed data in an accumulation buffer on the computing device. The computing device then checks whether the accumulated streamed data has reached the width of one sector of the target memory. When the accumulated streamed data has reached the sector width, the computing device writes the sector-wide streamed data into an available sector of the target memory. By performing sector-aligned writes wherein streamed data are aligned to sector boundaries when written to the target memory, the conventional operations of reading existing data from a sector to a buffer, then merging new data with the existing data in the buffer, then writing modified data from the buffer to the sector are avoided, reducing processing requirements.

In another aspect of the invention, the computing device performs writes of streamed and file management data using anchored cluster searches when needed. In anchored cluster searches, when a new cluster has to be allocated (when all sectors in current cluster are used up), the computing device consults a cluster anchor stored in a cluster anchor store on the computing device to identify the first available cluster. By starting searches for the first available cluster in the target memory using cluster anchors, rather than always starting searches sequentially with the lowest cluster sequence number, search times and processing requirements are further reduced. Three cluster anchors are used: one for files containing streamed data, one for subdirectory entries holding such files, and one for root directory entries holding such subdirectory entries.

In yet another aspect of the invention, the computing device creates directory entries using anchored index searches. In anchored index searches, when a new directory entry needs to be created in the target memory, the computing device consults an index anchor stored in an index anchor store on the computing device to identify the next available index at which to create the directory entry. The computing device then creates the directory entry at the identified index. The computing device then advances the index anchor to the next available index. By locating the next available index for directory entry creation using a creation index anchor, rather than searching for the next available index for directory entry creation starting from the usual start index of zero, search times and processing requirements are further reduced.

In yet another aspect of the invention, the computing device invokes companion caches for expediting reads and writes of file management data. The computing device has companion caches that store two sectors, respectively, of file management data [such as file allocation table (FAT) data for streamed data, subdirectory entries, or FAT data for subdirectory entries]. In addition, the computing device has a traditional sector cache for FAT root directory entries and a traditional sector cache for DAT root directory entries. When a sector of the file management data is to be read or written, the computing device determines whether the sector is one of the sectors stored in the companion caches or one of the traditional caches, and, if so, reads data from the matching cache to a buffer. Moreover, if the sector is not one of the sectors stored in the companion caches, the computing device determines whether to replace one of the sectors stored in one of the companion caches with the read or written sector without replacing the sector stored in the other one of the companion caches. Accordingly, if one of the sectors stored in one of the companion caches is replaced and the next read or write is directed to the sector stored in the other one of the companion caches, that sector does not have to be re-read from the target memory. By invoking companion caches in this manner for reads and writes of file management data, the frequency of cache hits is increased, further reducing processing requirements.

In yet another aspect of the invention, the computing device performs predictive cache updates. The computing device determines whether to replace a sector stored in one of the companion caches based on a prediction about whether the stored sector or a candidate replacement sector will be accessed again soonest. This prediction may take into account the sector numbers of the stored sectors and candidate replacement sector and/or whether the sector number of the candidate replacement sector is within an expected range of sector numbers. For example, if a cluster is allocated to store streamed data, it is highly likely that the sectors in this cluster will be referenced in the near future. Moreover, when a determination is made to replace a stored sector, the computing device makes a further determination about which one of the stored sectors to replace based on a prediction about which of the stored sectors will be accessed again soonest. This prediction may take into account the times when the stored sectors were cached. By performing predictive cache updates, the frequency of cache faults is further reduced, even further reducing processing requirements.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
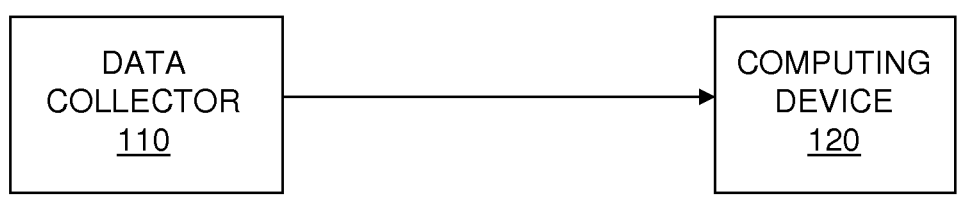
FIG. 1 shows a data collection system.

FIG. 1 shows a data collection system 10. System 10 includes a data collector 110 communicatively coupled with a computing device 120. Communicative coupling may be made over a wired or wireless data connection. In operation, data collector 110 continually collects data and transmits the data in a continuous data stream to computing device 120 whereon the streamed data are logged. Once logged on computing device 120, the streamed data are not accessed until offloaded to an external device, permitting various optimizations to be made to the file system on computing device 120 that expedite processing.

In some embodiments, collection system 10 is an ambulatory health monitoring system in which data collector 110 transmits data packets containing real-time body audio data (e.g., heart and lung sound), environment audio data, temperature data, accelerometer data and vital sign data (e.g., heart rate) to computing device 120 in a continuous data stream. In these embodiments, computing device 120 may be an embedded device and the data packets containing the real-time body audio data may be streamed on multiple data channels.

Figure 2:
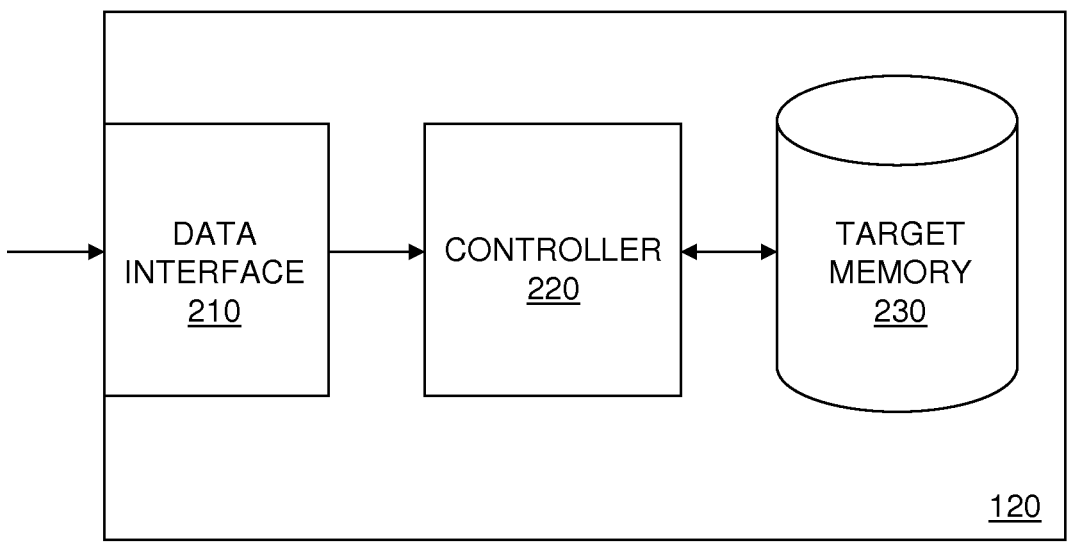
FIG. 2 shows a computing device.

FIG. 2 shows computing device 120 in more detail. Computing device 120 includes a data interface 210 for receiving the continuous data stream from data collector 110 and a controller 220 for processing data packets in the continuous data stream and logging streamed data from the data packets to a target memory 230. Controller 220 associates the streamed data being logged with a time of logging. In some embodiments, controller 220 creates every hour a root directory entry in target memory 230 for an hour folder named "YYMMDDHH" where YY represents the year in two digits, MM represents the month in two digits, DD represents the day in two digits and HH represents the hour in two digits. Within each hour folder, controller 220 creates every 15 seconds a subdirectory entry in target memory 230 for a data file for streamed data named "XMMSSCCC" where X represents in one digit the type of streamed data in the file (e.g., B for body audio data, E for environmental audio data, T for temperature data, A for accelerometer data and D for vital sign data), MM represents in two digits the minute, SS represents in two digits the second and CCC is a cyclic counter representing in three digits an order of files.

Figure 3:
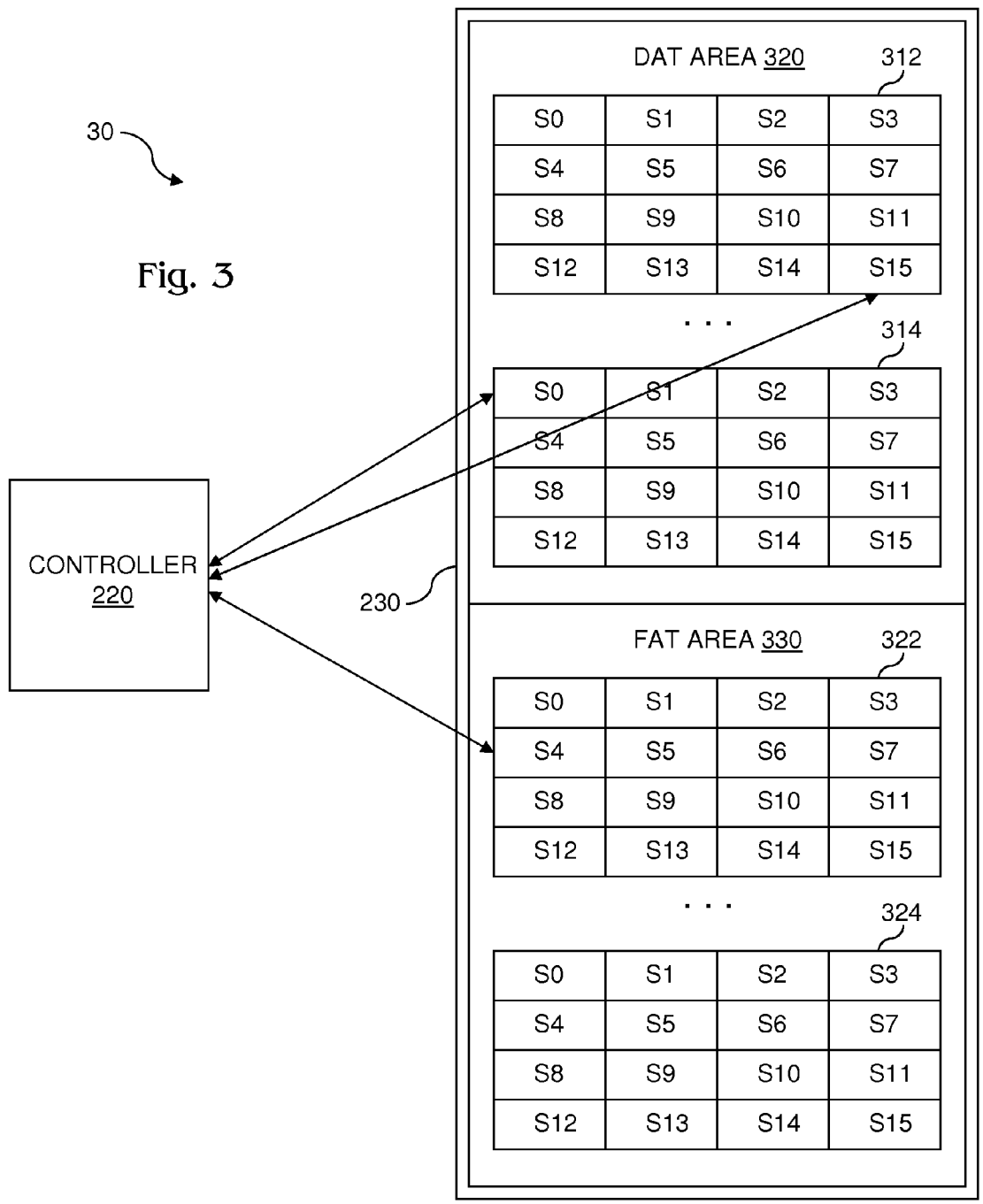
FIG. 3 shows a target memory.

FIG. 3 shows target memory 230 in more detail. Target memory 230 has a data (DAT) area 320 and a file allocation table (FAT) area 330. Each area includes a multiple of memory clusters of predetermined width (e.g., 8192 bytes) and each cluster includes a multiple of memory sectors of predetermined width (e.g., 512 bytes). For example, DAT area 320 includes clusters 312, 314 that each include 16 sectors (S0-S15), whereas FAT area 330 includes clusters 322, 324 that each include 16 sectors (S0-S15). Controller 220 writes streamed data into data files within DAT area 320 that may span multiple clusters which may be sequential or non-sequential. When all sectors in a cluster are filled, the cluster is closed and a new cluster is opened. The data files are indexed by writing to FAT area 330 and if a data file spans multiple clusters the clusters are linked by writing to FAT area 330 the address of the next cluster, thus in effect creating a linked list of cluster numbers in the FAT area. Root directory and subdirectory entries for the data files are also written to DAT area 320 and are indexed and linked (if necessary) by writing to FAT area 330.

Target memory 230 may be a 128-megabyte secure digital (SD) card. When formatted, the SD card may be divided into 16,384 clusters of 8192 bytes each. Target memory 230 can also be much larger; for example it may be a 16 GB SD card divided into 2,097,152 clusters. The clusters may be further divided between DAT clusters in DAT area 320 where data files and directory entries are stored and FAT clusters in FAT area 330 that store FAT tables indexing and linking the DAT clusters. Multiple redundant FAT tables may be maintained in FAT area 330 to avoid loss of data in the event the primary FAT table becomes corrupted.

The file system format may be FAT32, where within each FAT table, a four-byte slot will be reserved for each DAT cluster where an index to the next DAT cluster is stored. Assume, for example, that Cluster #2 of target memory 230 denotes the start of the primary FAT table and Cluster #80 denotes the start of DAT area 320. As example, when there is a need to write a 16,384-byte data file to DAT area 320, a search is made for a first available DAT cluster, say Cluster #100, and the first 8192 bytes of the data file are written to that cluster. Since there are 8192 bytes of the data file yet to be written, a search is made for a second available DAT cluster, say Cluster #102, and the remaining 8192 bytes of the data file are written to that cluster. Since the data file is written across multiple DAT clusters, there is a need to link the DAT clusters in the FAT area 330. Accordingly, the DAT clusters are linked by writing the value "102" into a four-byte slot reserved in the primary FAT table for Cluster #100. An end-of-file value (e.g., "−1") is written in the four-byte slot reserved in the FAT table for the final DAT cluster in which the data file is written.

Directory entries are also maintained for data files written to DAT area 320. In the FAT32 file system, for example, DAT area 320 includes root directories and subdirectories each having multiple 32-byte directory entries. Each directory entry contains information about a specific data file, including file name, file extension, file creation timestamp, a last file access timestamp, index of the starting DAT cluster of the file, file type and file size. Root directory entries and subdirectory entries are indexed and if necessary linked by writing to FAT area 330 in generally the same manner as described above with respect to data files.

Figure 4:
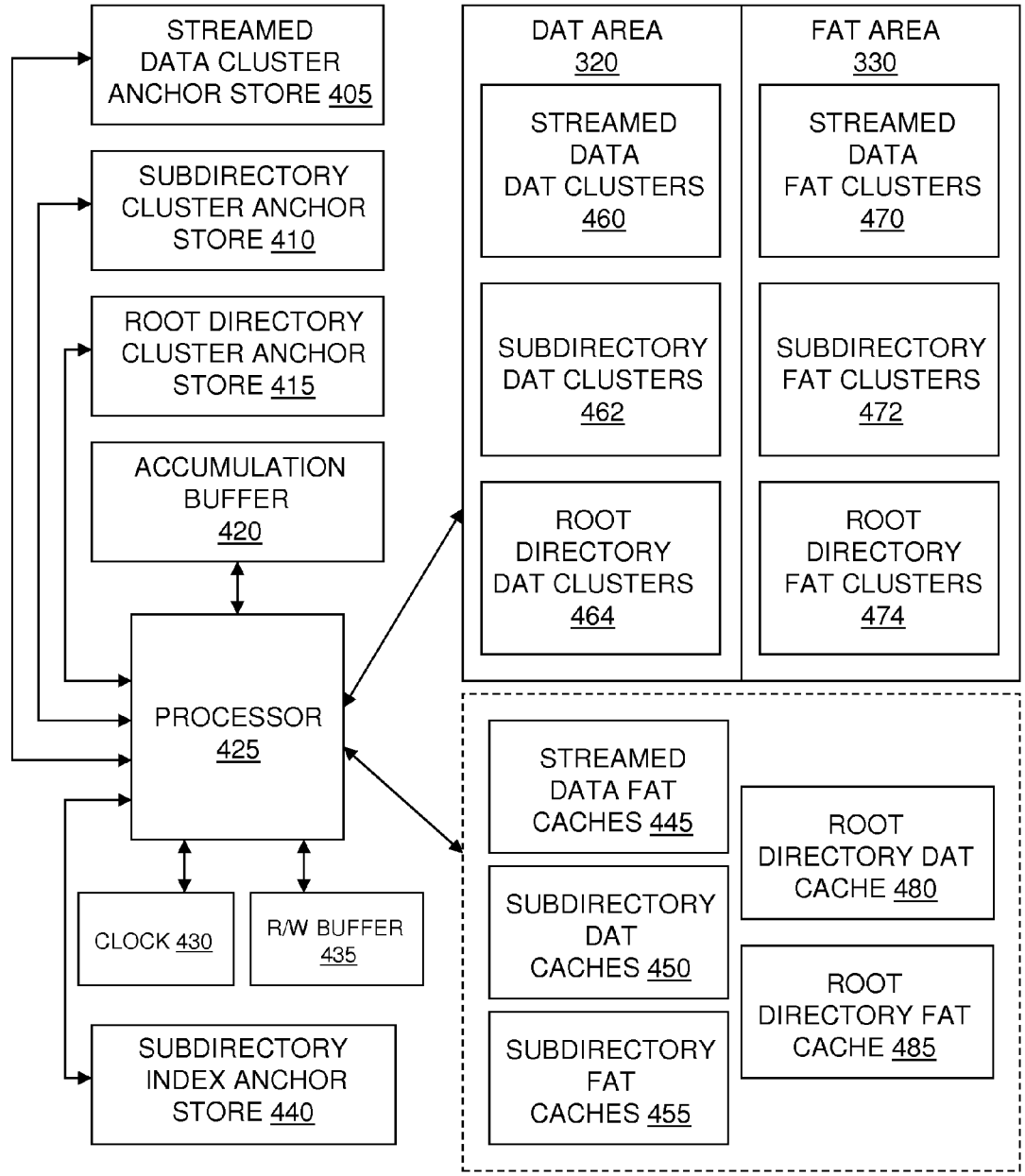
FIG. 4 shows elements of an optimized file system for a computing device.

Turning to FIG. 4, elements of an optimized file system 40 for computing device 120 are shown. Elements 405-455 and 480, 485 may be implemented on controller 220. In operation, processor 425 continuously logs streamed data to streamed data DAT clusters 460 within DAT area 320 until all of clusters 460 have been filled. File management data for streamed data are maintained in subdirectory DAT clusters 462 and root directory DAT clusters 464 within DAT area 320. Processor 425 may consult a real-time clock 430 to create, open and close folders and files covering discrete periods of observation to which the streamed data pertain. Indexing and linking data for DAT clusters 460, 462, 464 are maintained in FAT clusters 470, 472, 474, respectively, within FAT area 330. Once logged in streamed data DAT clusters 460, streamed data are not deleted until after being offloaded to an external device, permitting various optimizations to be made to file system 40 that expedite processing on computing device 120.

One file system optimization is sector-aligned writes of streamed data. In this optimization, data received on computing device 120 from data collector 110 in a continuous data stream are accumulated in an accumulation buffer 420 to the width of one sector. Once accumulated to sector width, the sector-wide data are written by processor 425 into an available sector within one of streamed data DAT clusters 460. Sector-aligned writes of streamed data expedite processing on computing device 120 by obviating the need for buffering the sector to be written to read/write buffer 435 when writing streamed data to target memory 230.

Another file system optimization is writing streamed data using anchored cluster searches. This optimization operates in conjunction with sector-aligned writes. In conventional file systems, when a new cluster needs to be allocated at the target memory, the file system sequentially searches clusters in the DAT area starting from a predetermined start cluster (whose sequence number is close to zero). However, since in optimized file system 40 streamed data are written sequentially and are not deleted once logged, there is no need to start each search for an available cluster at a predetermined start cluster. Accordingly, an anchored cluster search is performed in which the next available cluster is identified by a dynamically updated cluster anchor stored in a streamed data cluster anchor store 405. Streamed data writes using anchored cluster searches expedite processing on computing device 120 by starting searches for available clusters from dynamically updated cluster anchor points in streamed data DAT clusters 460 rather than from a predetermined start cluster.

Figure 5:
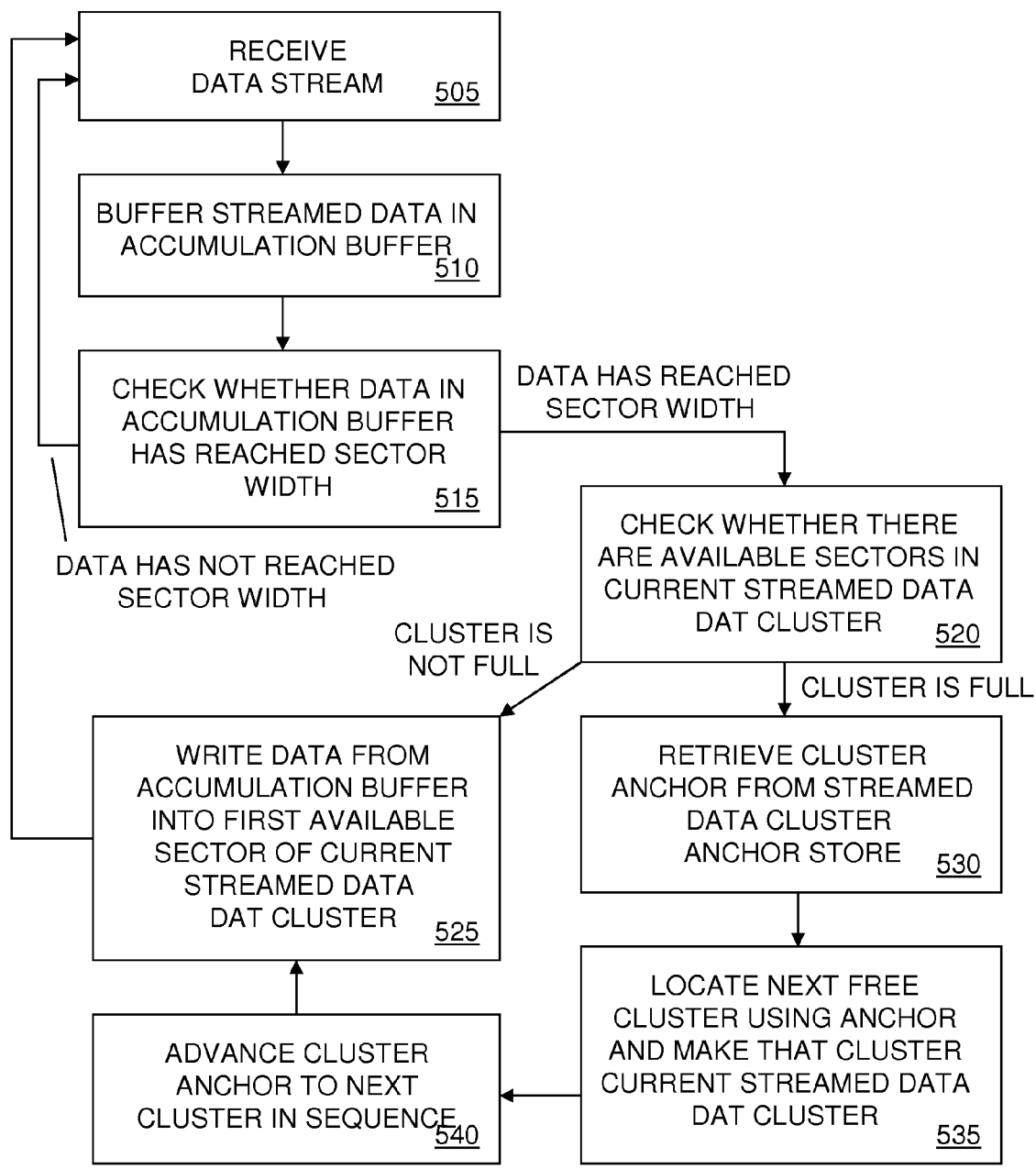
FIG. 5 shows a method for performing a sector-aligned write of streamed data using an anchored cluster search.

FIG. 5 illustrates a method for performing a sector-aligned write of streamed data on computing device 120 using an anchored cluster search. Data are received on computing device 120 in a continuous data stream (505). Processor 425 buffers the streamed data in accumulation buffer 420 (510). After a predetermined amount of streamed data has been buffered, processor 425 checks whether the streamed data accumulated in buffer 420 has reached the width of one sector (e.g., 512 bytes) (515). If the accumulated data has reached the sector width, processor 425 will see if there is an available sector in the current streamed data DAT cluster (520). If so, the sector-wide streamed data are written to the first available sector in the current streamed data DAT cluster (525). If not, processor 425 retrieves the cluster anchor from streamed data cluster anchor store 405 (530) and sequentially searches starting from the cluster identified by the cluster anchor for the next free cluster. When the next free cluster is found, processor 425 makes that cluster the current streamed data DAT cluster (535), advances the cluster anchor stored in streamed data cluster anchor store 405 to a next in sequence cluster (540) and writes the sector-wide streamed data to the first sector in the current streamed data DAT cluster (525).

Figure 6:
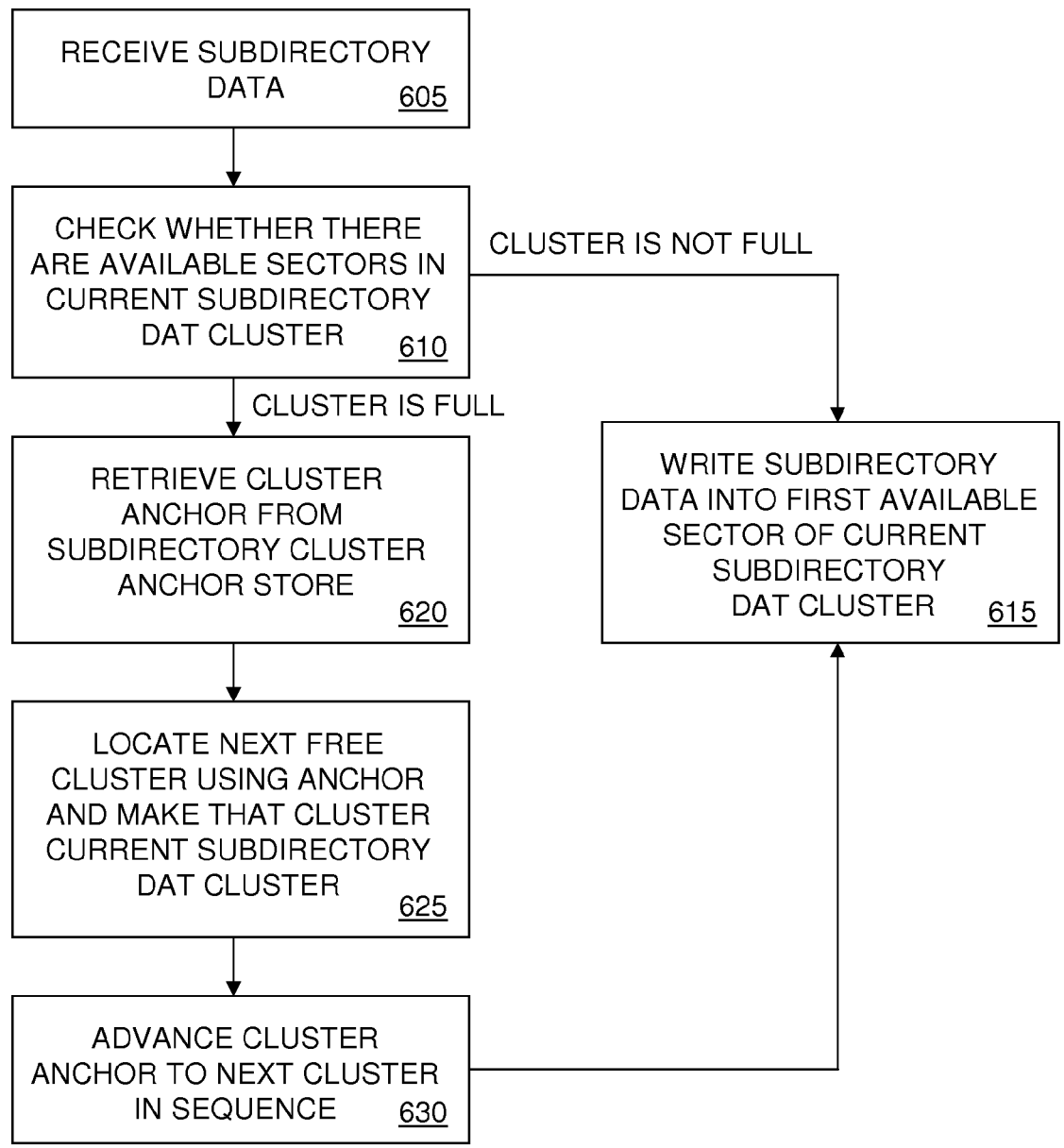
FIG. 6 shows a method for writing a subdirectory entry using an anchored cluster search.

Anchored cluster searches are also performed to expedite writes of subdirectory entries to subdirectory DAT clusters 462. FIG. 6 shows a method for writing subdirectory data on computing device 120 using an anchored cluster search. Processor 425 receives subdirectory data for writing to target memory 230 (605) and checks whether the current subdirectory cluster has a free sector (610). If the current subdirectory cluster has a free sector, processor 425 writes the subdirectory data to that sector (615). On the other hand, if all the sectors in the current subdirectory cluster are used up, processor 425 retrieves the cluster anchor from subdirectory cluster anchor store 410 (620). Processor 425 then sequentially searches starting from the cluster identified by the cluster anchor for the next free cluster and, when an available cluster is found, processor 425 makes that cluster the current subdirectory DAT cluster (625), advances the cluster anchor stored in subdirectory cluster anchor store 410 to a next in sequence cluster (630) and writes the subdirectory data to the first sector in the current subdirectory DAT cluster (615).

Figure 7:
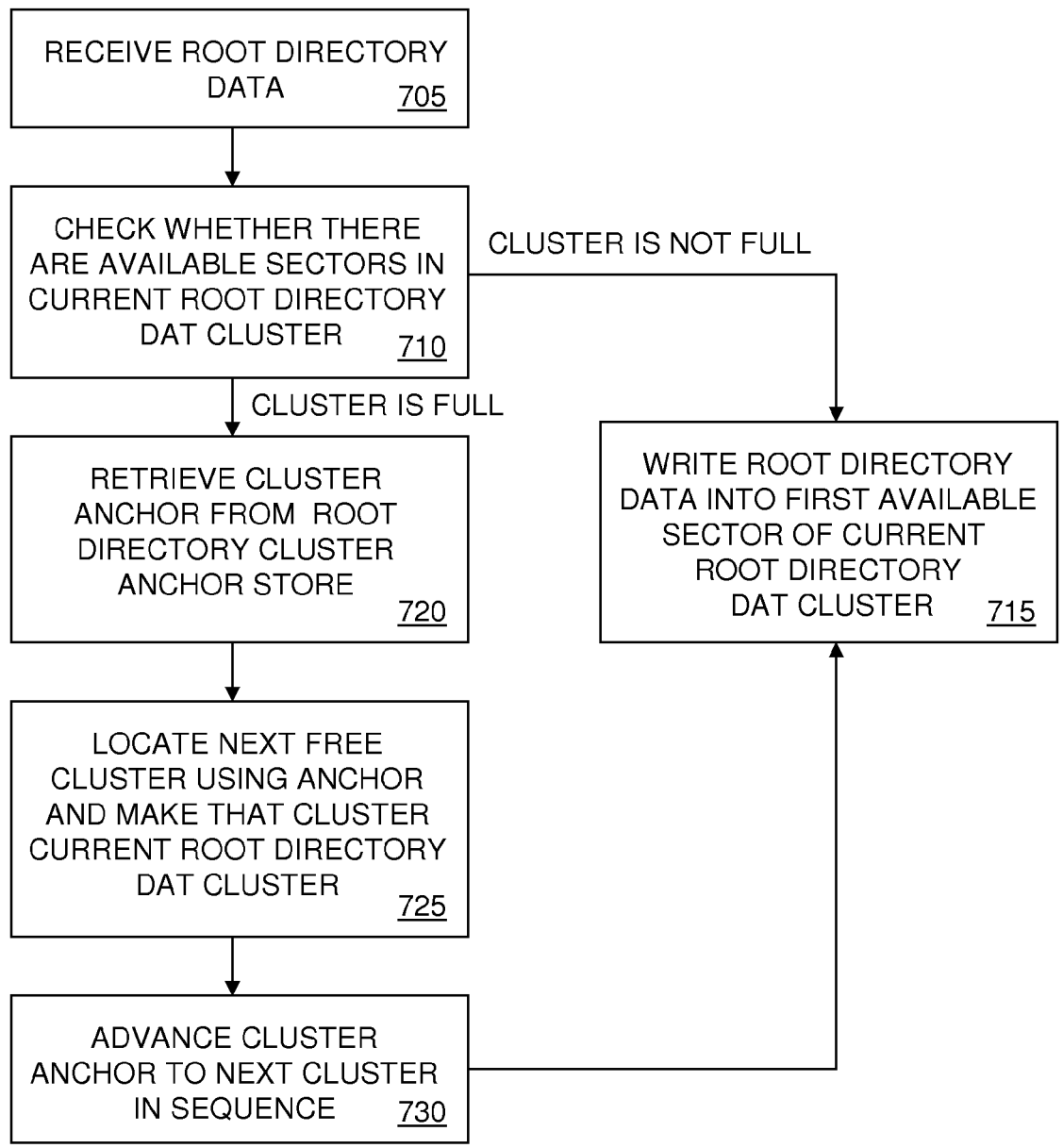
FIG. 7 shows a method for writing a root directory entry using an anchored cluster search.

Anchored cluster searches are also performed to expedite writes of root directory entries to root directory DAT clusters 464. FIG. 7 shows a method for writing root directory data on computing device 120 using an anchored cluster search. Processor 425 receives root directory data for writing to target memory 230 (705) and checks whether the current root directory cluster has a free sector (710). If the current root directory cluster has a free sector, processor 425 writes the root directory data to that sector (715). On the other hand, if all the sectors in the current root directory cluster are used up, processor 425 retrieves the cluster anchor from root directory cluster anchor store 415 (720). Processor 425 then sequentially searches starting from the cluster identified by the cluster anchor for an available cluster and, when an available cluster is found, processor 425 makes that cluster the current root directory DAT cluster (725), advances the cluster anchor stored in root directory cluster anchor store 415 to a next in sequence cluster (730) writes the root directory data to the first sector of the current root directory DAT cluster (715).

Another file system optimization is subdirectory entry creation using anchored index searches. In conventional file systems, when a new directory entry is to be created in a directory, the file system sequentially checks all entries in the directory to confirm that a directory entry for the same file name does not already exist and, if such an entry does not already exist, to identify the first available index where the new directory entry can be created. However, in optimized file system 40, subdirectory entries for files named in a minute-second format are created in a directory every 15 seconds and are not deleted once created. Accordingly, there is no risk that a subdirectory entry will be created for the same file name as an extant subdirectory entry created during a previous 15-second period and also no risk that there will be an available index in the subdirectory during the previous 15-second period due to deletion of an earlier subdirectory entry. Therefore, an anchored index search is performed in which the first available 32-byte index within one of subdirectory DAT clusters 462 for creating a subdirectory entry is identified by a dynamically updated index anchor stored in a subdirectory index anchor store 440.

Figure 8:
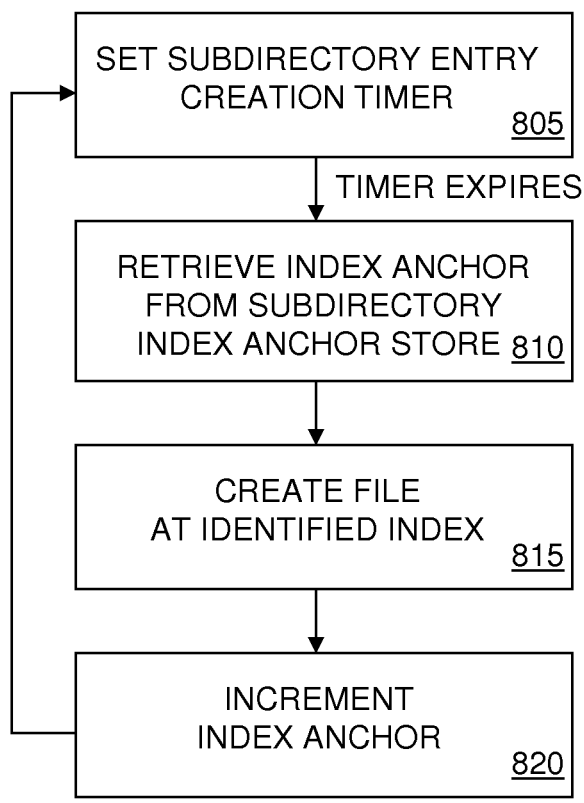
FIG. 8 shows a method for creating a subdirectory entry using an anchored index search.

FIG. 8 shows a method for creating by computing device 120 a subdirectory entry using an anchored index search. Processor 425 sets a next subdirectory entry creation timer (e.g., to expire in 15 seconds) (805). When the timer expires, processor 425 retrieves an index anchor from subdirectory index anchor store 440 (810) and creates at an index identified by the index anchor a subdirectory entry (e.g., for a file name "XMMSSCCC" holding 15 seconds worth of streamed data) (815). Processor 425 then increments the index anchor stored in subdirectory index anchor store 440 (820) and restarts the timer (805).

In some embodiments, instead of relying on a timer to open/write the next subdirectory entry, processor 425 performs an equivalent operation based on the amount of data pushed from data interface 210.

In some embodiments, a root directory index anchor store is also maintained on controller 220 to expedite processing by identifying an available root directory index at which to create a root directory entry.

Controller 220 maintains caches that are associated with DAT area 320 and FAT area 330, respectively. These caches expedite processing by retaining recently accessed sectors within areas 320, 330 so that re-reading of those sectors from target memory 230 is not required for every access. These caches are invoked when reading and writing file management data to clusters 462, 464, 470, 472, 474 (i.e., when reading and writing DAT data for subdirectory entries, DAT data for root directory entries, FAT data for streamed data, FAT data for subdirectory entries, FAT data for root directory entries), but are not invoked when reading and writing streamed data from and to target memory 230. Since root directory accesses are small in number (e.g., only 24 root directory entries are created in a day—one for each hour folder), a single cache 480 is maintained for reading and writing DAT data for root directory entries and a single cache 485 is also maintained for reading and writing FAT data for root directory entries. However, companion caches 445, 450, 455 are invoked for reading and writing FAT data for streamed data, DAT data for subdirectory entries and FAT data for subdirectory entries to reduce cache faults and expedite processing.

Accordingly, another file system optimization invokes streamed data FAT companion caches 445 for reads and writes of FAT data for streamed data. Sector-aligned writes obviate the need for sector buffering when writing streamed data to streamed data DAT clusters 460. However, sector buffering is still required when controller 220 writes FAT data for streamed data to streamed data FAT clusters 470 to preserve existing data in the sector. For example, when a streamed data file spans multiple streamed data DAT clusters 460, the clusters are linked by writing four-byte entries in one of streamed data FAT clusters 470. In conventional systems where there is a single sector cache for FAT data for streamed data, when these four-byte entries cross sector boundaries, a cache fault will result. On the other hand, optimized file system 40 maintains companion caches for FAT data for streamed data to reduce these cache faults.

Figure 9:
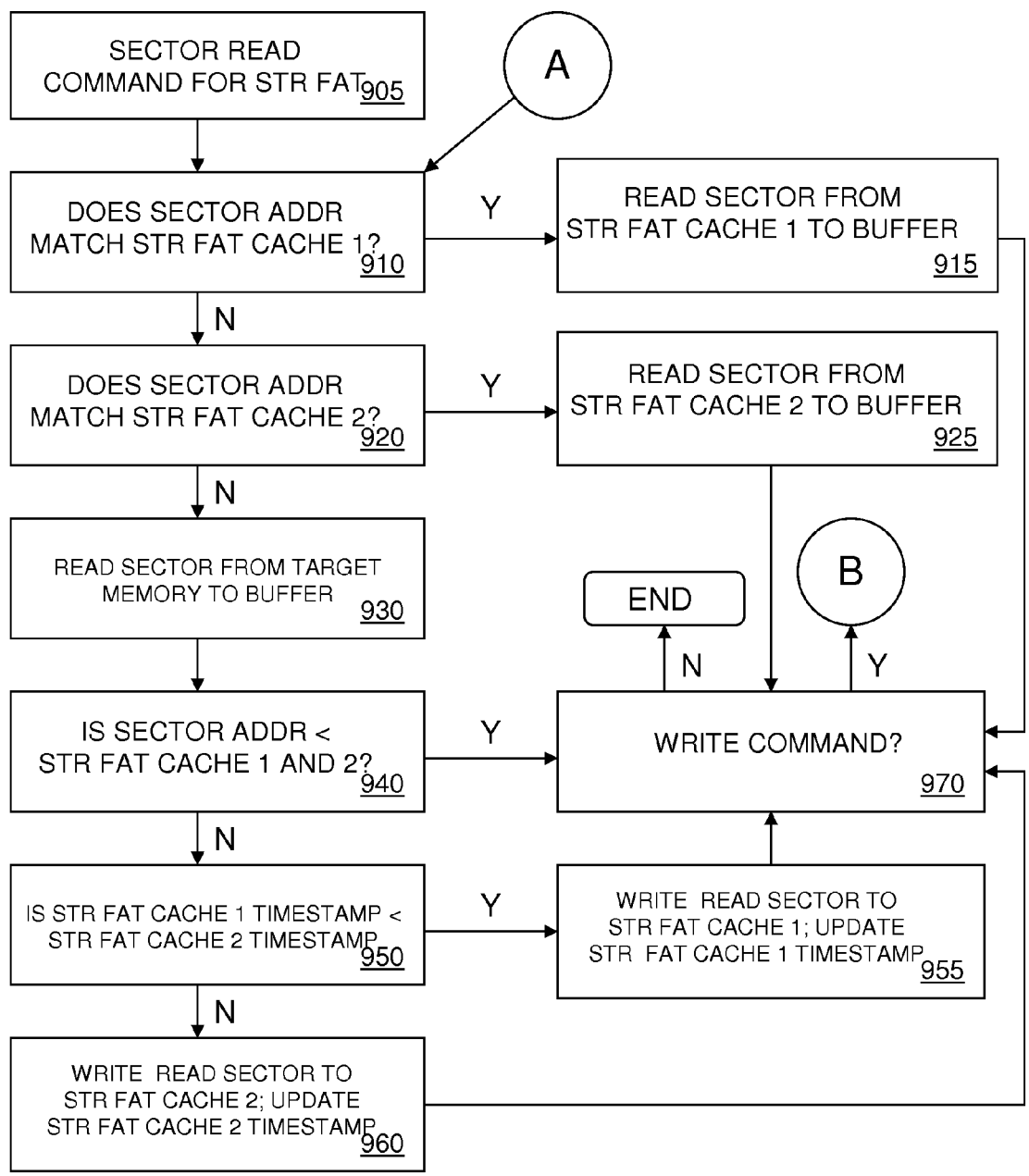
FIG. 9 shows a method for invoking companion caches for a read of FAT data for external data.

FIG. 9 shows a method for invoking companion streamed data FAT caches 445 when reading FAT data for streamed data. When a sector read command for FAT data for streamed data (STR FAT) is issued (905), processor 425 makes a first check whether the address of the sector to be read matches the address of the sector stored in a first cache reserved for streamed data FAT data (STR FAT CACHE 1) (910). If the first check results in a match, processor 425 reads the sector from the first cache to read/write buffer 435 (915). If the first check does not result in a match, processor 425 makes a second check whether the address of the sector to be read matches the address of the sector stored in a second cache reserved for streamed data FAT data (STR FAT CACHE 2) (920). If the second check results in a match, processor 425 reads the sector from the second cache to buffer 435 (925). If the second check does not result in a match, processor 425 reads the sector from target memory 230 to buffer 435 (930) and processor 425 then makes a third check whether the address of the sector read from target memory 230 is lower than the addresses of the sectors stored in the first and second cache (940). If the address of the sector read from target memory 230 is lower than the addresses of the sectors stored in the first and second cache, further reads from this sector are considered unlikely in the near term and neither of caches 445 is updated. However, if the address of the sector read from target memory 230 is higher than the address of the sector stored in one or both of the first and second cache, an update of the oldest one of caches 445 is performed. Accordingly, processor 425 checks whether the first or the second cache has the earlier creation timestamp (950). If the first cache has the earlier creation timestamp, processor 425 writes the read sector to the first cache and updates the first cache timestamp (955). If, on the other hand, the second cache has the earlier creation timestamp, processor 425 writes the read sector to the second cache and the second cache timestamp is updated (960).

Figure 10:
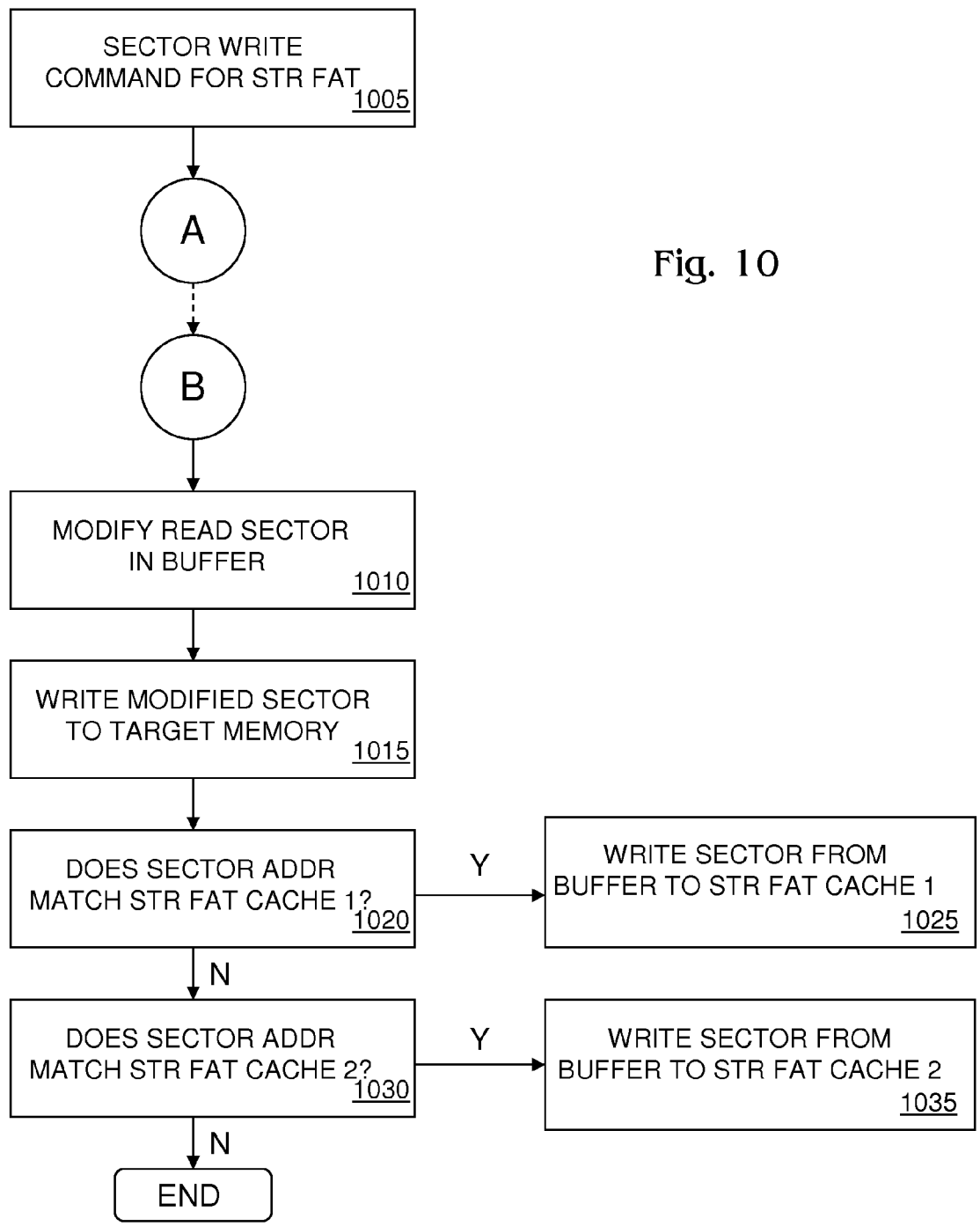
FIG. 10 shows a method for invoking companion caches for a write of FAT data for external data.

FIG. 10 shows a method for invoking companion caches 445 when writing FAT data for streamed data. The flow proceeds generally as in FIG. 9, except that processor 425 performs additional steps after sector is read to buffer 435 to ensure that when the read sector is modified and written to target memory 230, the cache (if any) in which the modified sector is stored is updated to reflect the modification. Thus, when a sector write command for FAT data for streamed data (STR FAT) is issued (1005), processor 425 reads the sector to buffer 435 in accordance with FIG. 9, and since the command is a write command (970), processor 425 further modifies the read sector in buffer 435 (1010) and writes the modified sector to target memory 230 (1015). Processor 425 then makes a first check whether the address of the modified sector matches the address of the sector stored in the first cache (1020). If the first check results in a match, processor 425 writes the modified sector from buffer 435 to the first cache (1025). If the first check does not result in a match, processor 425 makes a second check whether the address of the modified sector matches the address of the sector stored in the second cache (1030). If the second check results in a match, processor 425 writes the modified sector from buffer 435 to the second cache (1035).

Another file system optimization invokes companion subdirectory DAT caches 450 for reads and writes of subdirectory entries. As mentioned, a sector may have 512 bytes whereas each subdirectory entry may have 32 bytes. In that event, a sector can store just 16 subdirectory entries. Subdirectory entries open at a given time may therefore reside in different sectors. In conventional systems where there is a single sector cache for subdirectory entries, when consecutive reads or writes are made to subdirectory entries in different sectors, a cache fault will result. On the other hand, optimized file system 40 maintains companion caches for subdirectory entries to reduce these cache faults.

Figure 11:
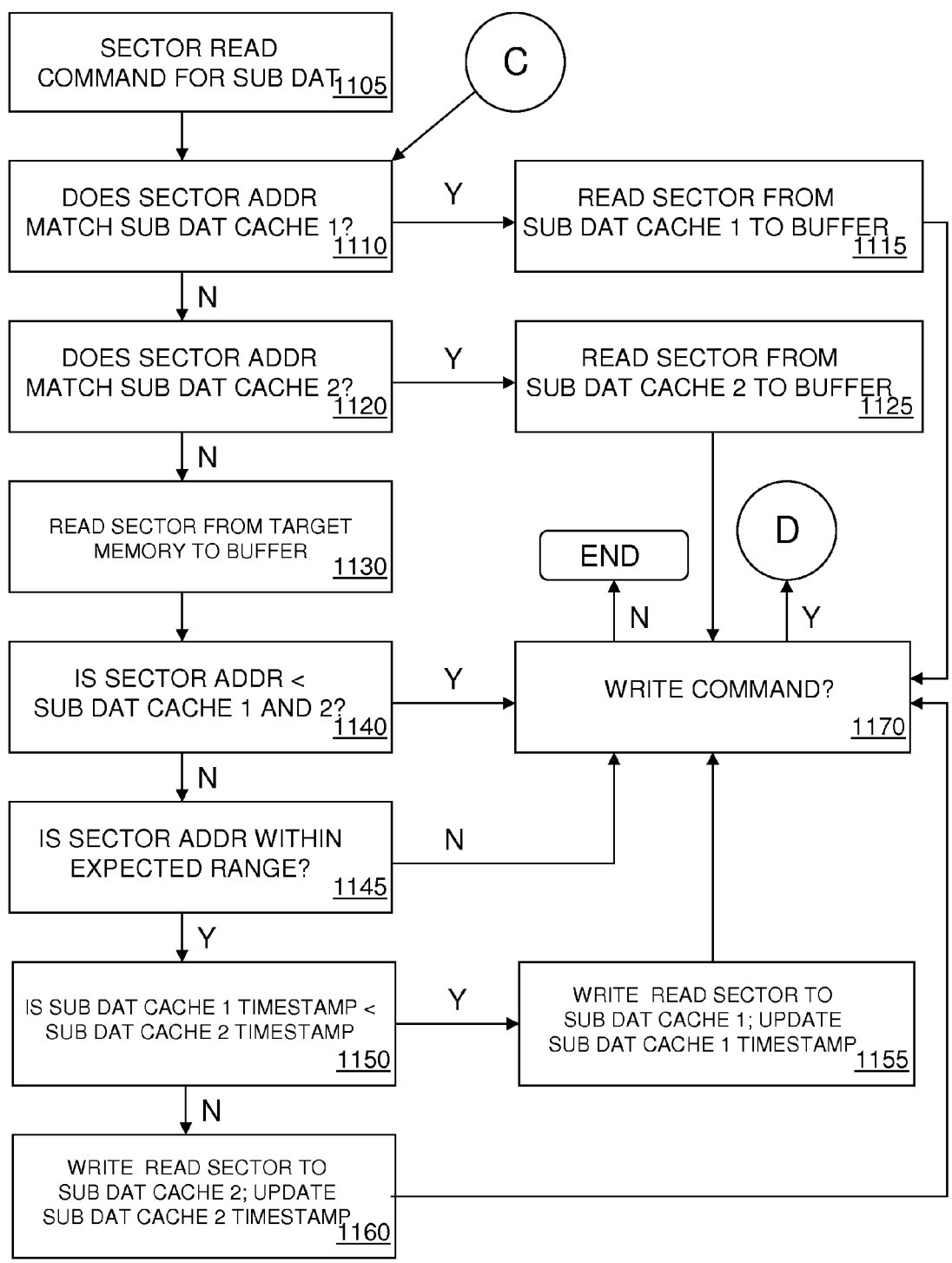
FIG. 11 shows a method for invoking companion caches for a read of a subdirectory entry.

FIG. 11 shows a method for invoking companion subdirectory DAT caches 450 when reading a subdirectory entry. When a sector read command for a subdirectory entry (SUB DAT) is issued (1105), a first check is made whether the address of the sector to be read matches the address of the sector stored in a first cache reserved for subdirectory entries (SUB DAT CACHE 1) (1110). If the first check results in a match, the sector is read from the first cache to buffer 435 (1115). If the first check does not result in a match, a second check is made whether the address of the sector to be read matches the address of the sector stored in a second cache reserved for subdirectory entries (SUB DAT CACHE 2) (1120). If the second check results in a match, the sector is read from the second cache to buffer 435 (1125). If the second check does not result in a match, the sector is read from target memory 230 to buffer 435 (1130) and a third check is made whether the address of the sector read from target memory 230 is lower than the addresses of the sectors stored in the first and second cache (1140). If the address of the sector read from target memory 230 is lower than the addresses of the sectors stored in the first and second cache, further near-term reads from this sector are considered unlikely and neither of caches 450 is updated. However, if the address of the sector read from target memory 230 is higher than the address of the sector stored in one or both of the first and second cache, a fourth check is made whether the address of the sector read from target memory 230 is in an expected range (1145), as sector addresses of future subdirectory accesses are calculable in some instances (e.g., when a new one of subdirectory DAT clusters 462 is allocated, future sector references will be in the range of the sectors in this cluster). If the address of the sector read from target memory 230 is outside the expected range, further near-term reads from this sector are considered unlikely and the caches are not updated. On the other hand, if the address of the sector is within the expected range, an update of the oldest cache is performed. Accordingly, a check is made whether the first or the second cache has the earlier creation timestamp (1150). If the first cache has the earlier creation timestamp, the read sector is written to the first cache and the first cache timestamp is updated (1155). If, on the other hand, the second cache has the earlier creation timestamp, the read sector is written to the second cache and the second cache timestamp is updated (1160).

Figure 12:
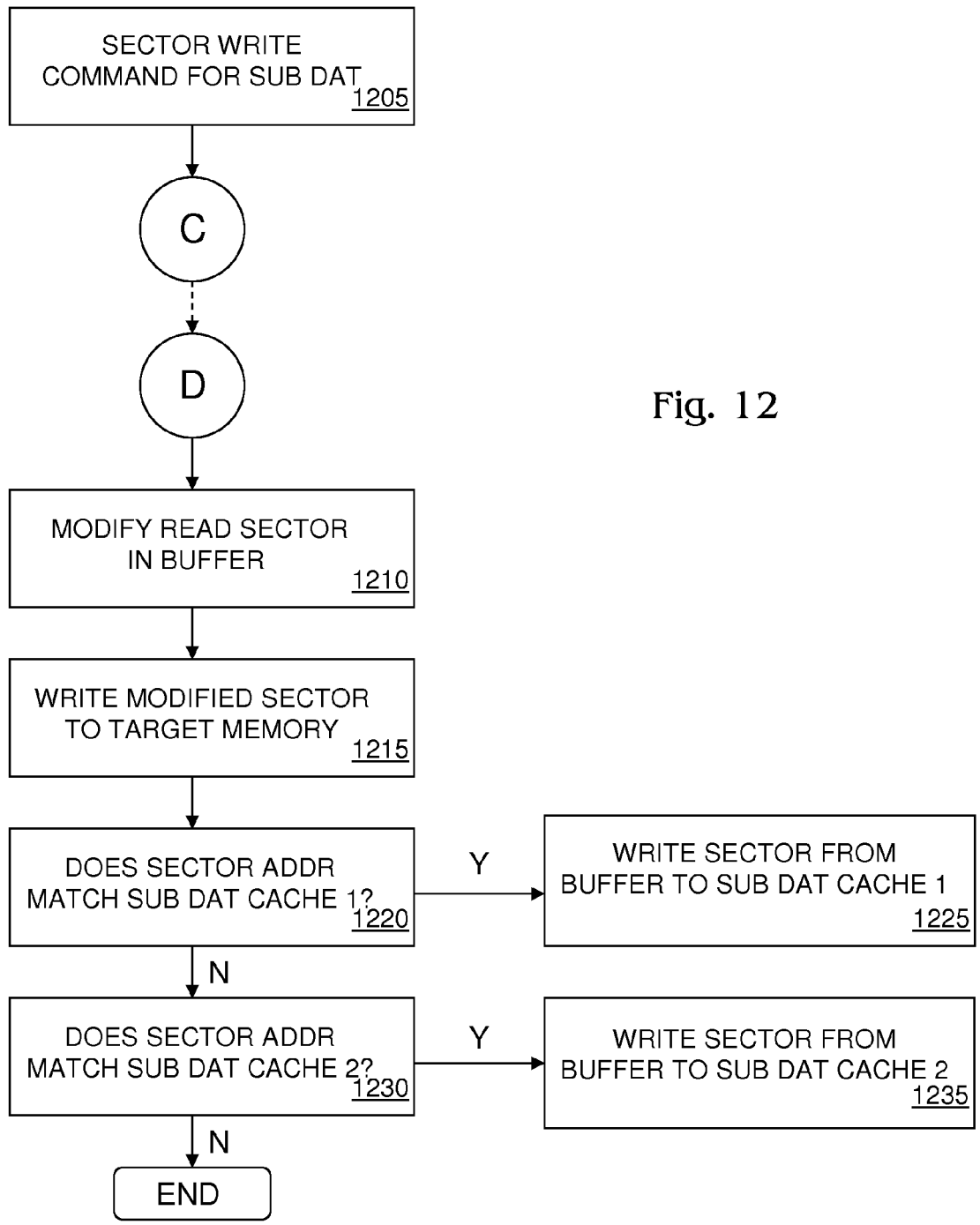
FIG. 12 shows a method for invoking companion caches for a write of a subdirectory entry.

FIG. 12 shows a method for invoking companion caches 450 when writing a subdirectory entry. The flow proceeds generally as in FIG. 11, except that additional steps are performed after sector is read to buffer 435 to ensure that when the read sector is modified and written to target memory 230, the cache (if any) in which the modified sector is stored is updated to reflect the modification. Thus, when a sector write command for a subdirectory entry (SUB DAT) is issued (1205), the sector is read to buffer 435 in accordance with FIG. 11, and since the command is a write command (1170), the read sector is modified in buffer 435 (1210) and the modified sector is written to target memory 230 (1215). A first check is then made whether the address of the modified sector matches the address of the sector stored in the first cache (1220). If the first check results in a match, the modified sector is written from buffer 435 to the first cache (1225). If the first check does not result in a match, a second check is made whether the address of the modified sector matches the address of the sector stored in the second cache (1230). If the second check results in a match, the modified sector is written from buffer 435 to the second cache (1235).

Figure 13:
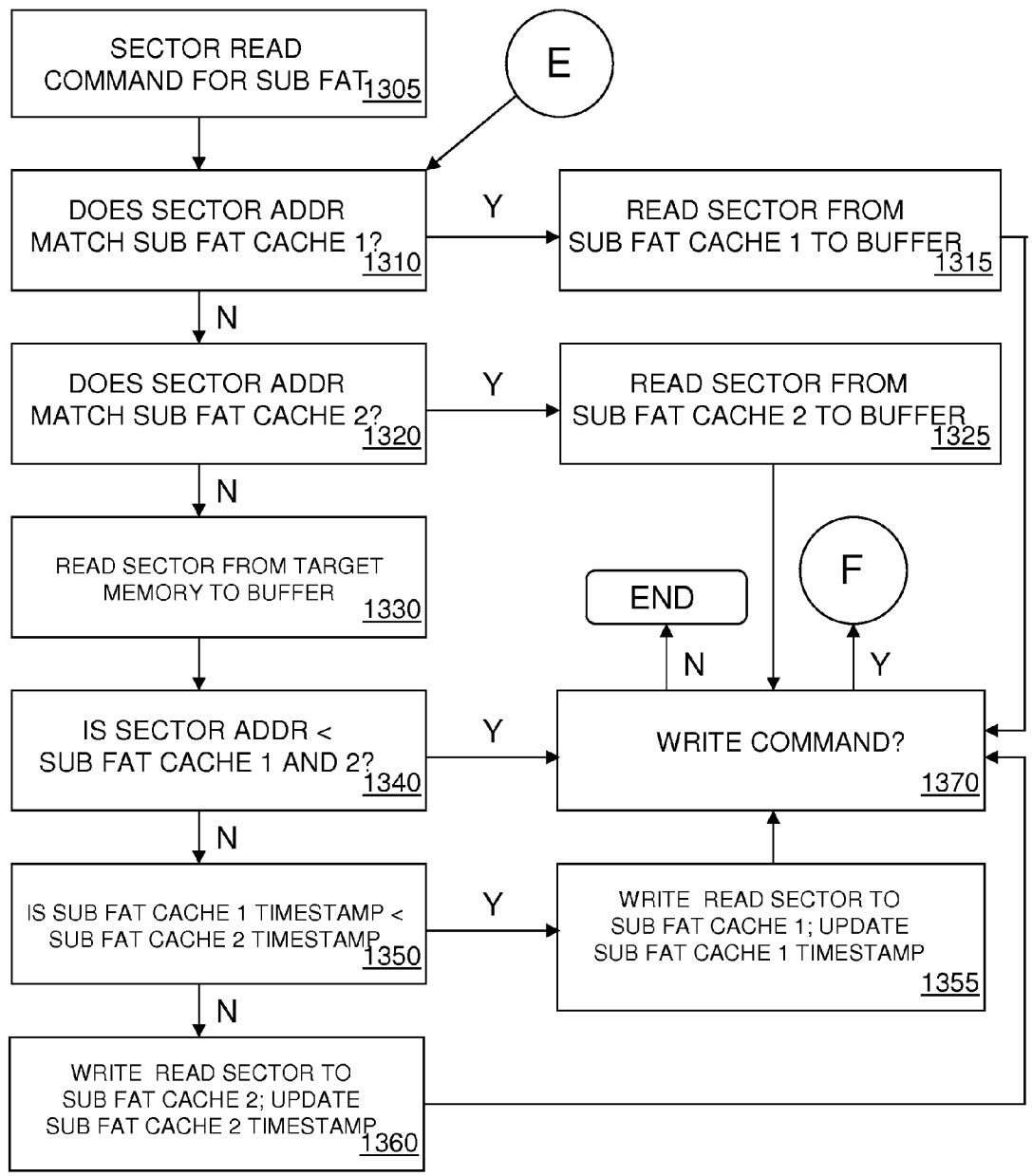
FIG. 13 shows a method for invoking companion caches for a read of FAT data for a subdirectory entry.

Another file system optimization invokes companion subdirectory FAT caches 455 for reads and writes of FAT data for subdirectory entries. FIG. 13 shows a method for invoking companion caches 455 when reading FAT data for a subdirectory entry. When a sector read command for FAT data for a subdirectory entry (SUB FAT) is issued (905), a first check is made whether the address of the sector to be read matches the address of the sector stored in a first cache reserved for subdirectory FAT data (SUB FAT CACHE 1) (1310). If the first check results in a match, the sector is read from the first cache to buffer 435 (1315). If the first check does not result in a match, a second check is made whether the address of the sector to be read matches the address of the sector stored in a second cache reserved for subdirectory FAT data (SUB FAT CACHE 2) (1320). If the second check results in a match, the sector is read from the second cache to buffer 435 (1325). If the second check does not result in a match, the sector is read from target memory 230 to buffer 435 (1330) and a third check is made whether the address of the sector read from target memory 230 is lower than the addresses of the sectors in the first and second cache (1340). If the address of the sector read from target memory 230 is lower than the addresses of the sectors stored in the first and second cache, further near-term reads from this sector are considered unlikely and neither of caches 455 is updated. However, if the address of the sector read from target memory 230 is higher than the address of the sector stored in one or both of the first and second cache, an update of the oldest cache is performed. Accordingly, a check is made whether the first or the second cache has the earlier creation timestamp (1350). If the first cache has the earlier creation timestamp, the read sector is written to the first cache and the first cache timestamp is updated (1355). If, on the other hand, the second cache has the earlier creation timestamp, the read sector is written to the second cache and the second cache timestamp is updated (1360).

Figure 14:
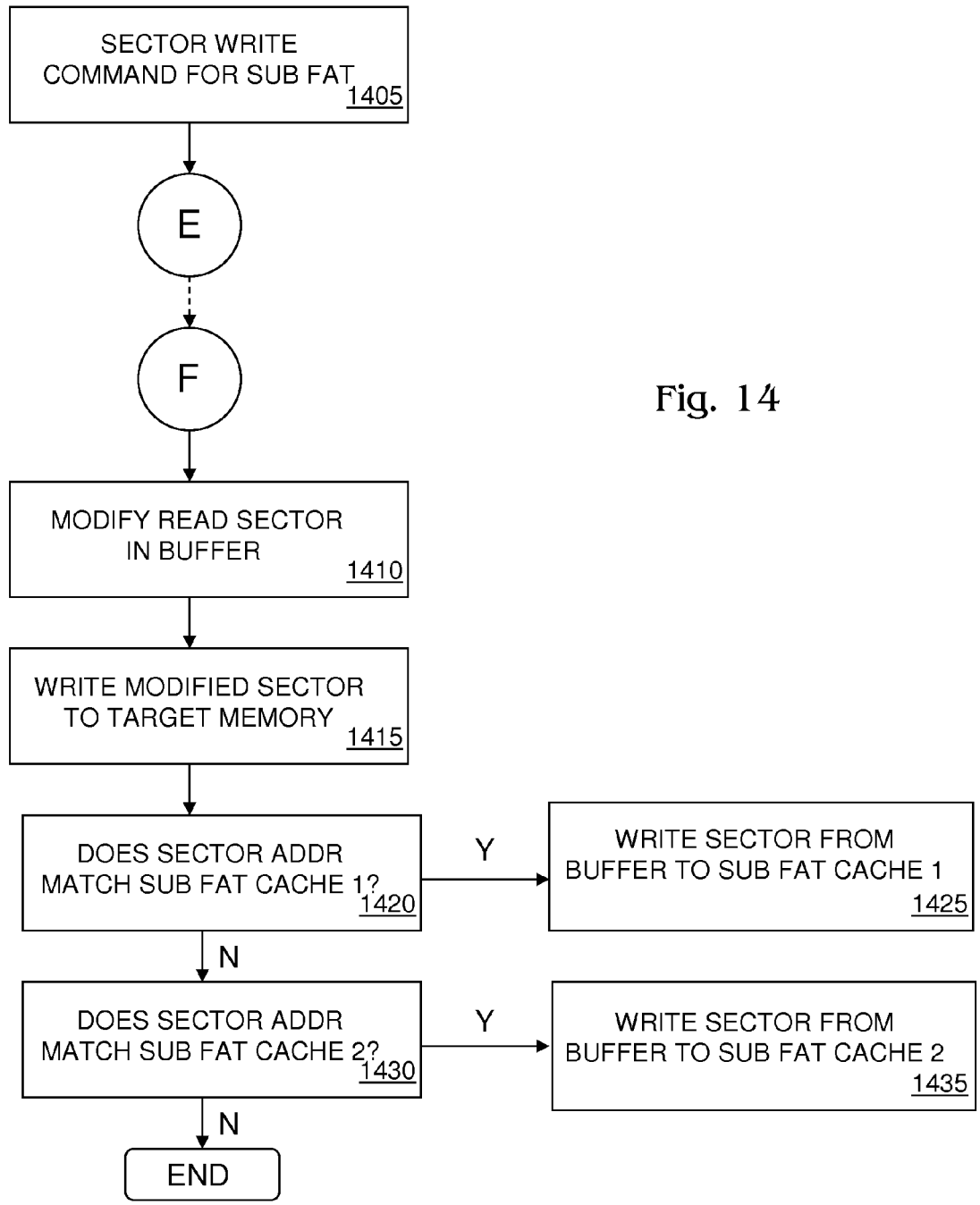
FIG. 14 shows a method for invoking companion caches for a write of FAT data for a subdirectory entry.

FIG. 14 shows a method for invoking companion caches 455 when writing FAT data for a subdirectory entry. The flow proceeds generally as in FIG. 13, except that additional steps are performed after sector is read to buffer 435 to ensure that when the read sector is modified and written to target memory 230, the cache (if any) in which the modified sector is stored is updated to reflect the modification. Thus, when a sector write command for subdirectory FAT data (SUB FAT) is issued (1405), the sector is read to buffer 435 in accordance with FIG. 13, and since the command is a write command (1370), the read sector is modified in buffer 435 (1410) and the modified sector is written to target memory 230 (1415). A first check is then made whether the address of the modified sector matches the address of the sector stored in the first cache (1420). If the first check results in a match, the modified sector is written from buffer 465 to the first cache (1425). If the first check does not result in a match, a second check is made whether the address of the modified sector matches the address of the sector stored in the second cache (1430). If the second check results in a match, the modified sector is written from the buffer to the second cache (1435).

In some embodiments, conflict checks are performed to prevent clashes between caches. In these conflict checks, sector addresses of sectors stored in caches are compared for matches and, in the event of a match, the lower priority one of the matching caches is invalidated, and contents are updated at the higher priority cache as required.

It will be appreciated by those of ordinary skill in the art that the invention can be embodied in other specific forms without departing from the spirit or essential character hereof. The present description is considered in all respects to be illustrative and not restrictive. The scope of the invention is indicated by the appended claims, and all changes that come with in the meaning and range of equivalents thereof are intended to be embraced therein.

What is claimed is:

1. A computing device, comprising:
   a data interface configured to receive a continuous data stream containing streamed data;
   a target memory having a plurality of clusters each having a plurality of sectors; and
   a controller configured to write the streamed data into the target memory, wherein the streamed data are accumulated in an accumulation buffer on the computing device until the streamed data reach a predetermined sector width whereupon the controller is configured to write the sector-wide streamed data into one of the clusters having an available sector, and wherein the controller is configured to detect that a first one of the clusters has no available sector and write the sector-wide streamed data into a second one of the clusters identified using a cluster anchor stored in a cluster anchor store on the computing device, wherein the computing device has companion caches each configured to store one sector of file management data associated with streamed data received in the continuous data stream, wherein in response to a command to access file management data the controller is configured to read the file management data from one of the companion caches when the file management data are stored in one of the companion caches and read the file management data from the target memory when the file management data are not stored in either one of the companion caches, and wherein the controller is configured to selectively replace the sector of file management data stored in one of the companion caches when the file management data are not stored in either one of the companion caches.

2. The computing device of claim 1, wherein the controller is configured to advance the cluster anchor stored in the cluster anchor store to identify a third one of the clusters.

3. The computing device of claim 1, wherein the controller is configured to replace the sector of file management data stored in one of the companion caches when the command is associated with a sector address that is higher than a sector address of the sector stored in one of the companion caches.

4. The computing device of claim 1, wherein the controller is configured to replace the sector of file management data stored in one of the companion caches when the command is associated with a sector address within an expected range of sector addresses.

5. The computing device of claim 1, wherein the controller is configured to replace the sector of file management data stored in one of the companion caches associated with an earlier timestamp.

6. A computing device, comprising:
   a data interface configured to receive a continuous data stream containing streamed data;
   a target memory having a plurality of clusters each having a plurality of sectors; and
   a controller configured to write the streamed data into the target memory, wherein the streamed data are accumulated in an accumulation buffer on the computing device until the streamed data reach a predetermined sector width whereupon the controller is configured to write the sector-wide streamed data into one of the clusters having an available sector, and wherein the controller is configured to detect that a first one of the clusters has no available sector and write the sector-wide streamed data into a second one of the clusters identified using a cluster anchor stored in a cluster anchor store on the computing device, wherein the controller is configured to write a multiple of types of file management data associated with streamed data received in the continuous data stream into clusters in the target memory identified using cluster anchors stored in a multiple of cluster anchor stores on the computing device dedicated to the respective types of file management data.

7. A computing device, comprising:
   a data interface configured to receive a continuous data stream containing streamed data;
   a target memory having a plurality of clusters each having a plurality of sectors; and
   a controller configured to write the streamed data into the target memory, wherein the streamed data are accumulated in an accumulation buffer on the computing device until the streamed data reach a predetermined sector width, whereupon the controller is configured to write the sector-wide streamed data into one of the clusters having an available sector, and wherein the controller is configured to detect that a first one of the clusters has no available sector and write the sector-wide streamed data into a second one of the clusters identified using a cluster anchor stored in a cluster anchor store on the computing device, wherein the computing device has a multiple of sets of companion caches, wherein each set of companion caches is dedicated to a different type of file management data associated with streamed data received in the continuous data stream, wherein each companion cache is configured to store one sector of file management data.

8. A computing device, comprising:
   a data interface configured to receive a continuous data stream containing streamed data;
   a target memory having a plurality of clusters each having a plurality of sectors; and
   a controller configured to write the streamed data into the target memory, wherein the streamed data are accumulated in an accumulation buffer on the computing device until the streamed data reach a predetermined sector width whereupon the controller is configured to write the sector-wide streamed data into one of the clusters having an available sector, and wherein the controller is configured to detect that a first one of the clusters has no available sector and write the sector-wide streamed data into a second one of the clusters identified using a cluster anchor stored in a cluster anchor store on the computing device, wherein the controller is configured to create a subdirectory entry associated with streamed data received in the continuous data stream at a subdirectory entry creation index in an available one of the sectors of the target memory, wherein the controller is configured to identify the subdirectory entry creation index from an subdirectory entry creation index anchor stored in a subdirectory entry creation index anchor store on the computing device.

9. A computing device, comprising:
a target memory having a plurality of sectors; and
a controller configured to write data into the target memory, wherein the computing device has companion caches each configured to store a copy of one sector of data stored in the target memory, wherein in response to a command to access data stored in the target memory the controller is configured to read the data to be accessed from one of the companion caches when the data to be accessed are stored in one of the companion caches and read the data to be accessed from the target memory when the data to be accessed are not stored in either one of the companion caches, wherein the controller is configured to selectively replace the sector of data stored in one of the companion caches when the data to be accessed are not stored in either one of the companion caches.

10. The computing device of claim 9, wherein the controller is configured to replace the sector of data stored in one of the companion caches when the command is associated with a sector address that is higher than a sector address of the sector stored in one of the companion caches.

11. The computing device of claim 9, wherein the controller is configured to replace the sector of data stored in one of the companion caches when the command is associated with a sector address within an expected range of sector addresses.

12. The computing device of claim 9, wherein the controller is configured to replace the sector of data stored in one of the companion caches associated with an earlier timestamp.

13. The computing device of claim 9, wherein the companion caches are dedicated to a particular type of file management data.

14. The computing device of claim 9, wherein the companion caches are dedicated to file allocation table (FAT) data for streamed data.

15. The computing device of claim 9, wherein the companion caches are dedicated to subdirectory data.

16. The computing device of claim 9, wherein the companion caches are dedicated to FAT data for subdirectory data.

* * * * *